(12) United States Patent
Ono

(10) Patent No.: US 6,762,981 B2
(45) Date of Patent: Jul. 13, 2004

(54) TRACK JUMP CONTROLLER AND A TRACK JUMP METHOD

(75) Inventor: Takayuki Ono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 244 days.

(21) Appl. No.: 10/079,650

(22) Filed: Feb. 20, 2002

(65) Prior Publication Data

US 2002/0163864 A1 Nov. 7, 2002

(30) Foreign Application Priority Data

Feb. 20, 2001 (JP) .................................... P 2001-043094

(51) Int. Cl.$^7$ ................................................ G11B 7/00
(52) U.S. Cl. .................................. 369/44.28; 369/44.29
(58) Field of Search ........................... 369/44.28, 44.29, 369/44.26, 44.25, 44.13, 44.34, 44.32, 44.36, 30.17, 30.15, 53.35, 30.36, 30.1, 44.27, 30.13, 43; 318/632, 560, 629, 561

(56) References Cited

U.S. PATENT DOCUMENTS

| | | | | | |
|---|---|---|---|---|---|
| 4,817,073 A | * | 3/1989 | Suzuki | ................. | 369/44.28 |
| 4,819,219 A | * | 4/1989 | Nagano | ................. | 369/30.16 |
| 5,065,383 A | * | 11/1991 | Tateishi et al. | ......... | 369/44.28 |
| 5,164,646 A | * | 11/1992 | Tawaragi et al. | ........... | 318/560 |
| 5,216,650 A | * | 6/1993 | Noguchi | ................. | 369/44.28 |
| 5,408,454 A | * | 4/1995 | Hasegawa | ................ | 369/44.25 |
| 5,532,988 A | * | 7/1996 | Yokogama | ............... | 369/44.28 |
| 5,621,709 A | * | 4/1997 | Takahashi | ................ | 369/44.32 |
| 6,545,957 B1 | * | 4/2003 | Hiraga et al. | ............ | 369/44.28 |
| 6,611,123 B2 | * | 8/2003 | Ono | ........................... | 318/632 |
| 6,690,628 B2 | * | 2/2004 | Yoshimi et al. | .......... | 369/44.28 |

FOREIGN PATENT DOCUMENTS

| JP | 9-102135 | 4/1997 |
|---|---|---|
| JP | 2000-353324 | 12/2000 |

* cited by examiner

Primary Examiner—Ali Neyzari
(74) Attorney, Agent, or Firm—Osha & May L.L.P.

(57) ABSTRACT

A disk apparatus 10 includes a DSP 36. The DSP 36 controls each circuit component under the instruction from an MCU 44. When a braking pulse is applied to a driver 38b at the end of a jump, a corresponding tracking actuator control voltage is supplied to a tracking actuator 16. Then a DSP core 36a determines whether the TE signal level becomes equal to or below the predetermined value within a predetermined period shorter than the zero crossing cycle of the TE signal. In case the TE signal level does not become equal to or below the predetermined value within the predetermined period, the DSP core 36a determines that the travel direction of an objective lens 14 with respect to a disk 22 is reversed and applies a correction pulse having a polarity opposite to that of the braking pulse thus accelerating the objective lens 14.

6 Claims, 10 Drawing Sheets

TO INTERNAL CIRCUMFERENCE ← → TO PERIPHERY

DISK ROTATING DIRECTION (TANGENTIAL DIRECTION)

100μSEC 100μSEC 100μSEC 100μSEC

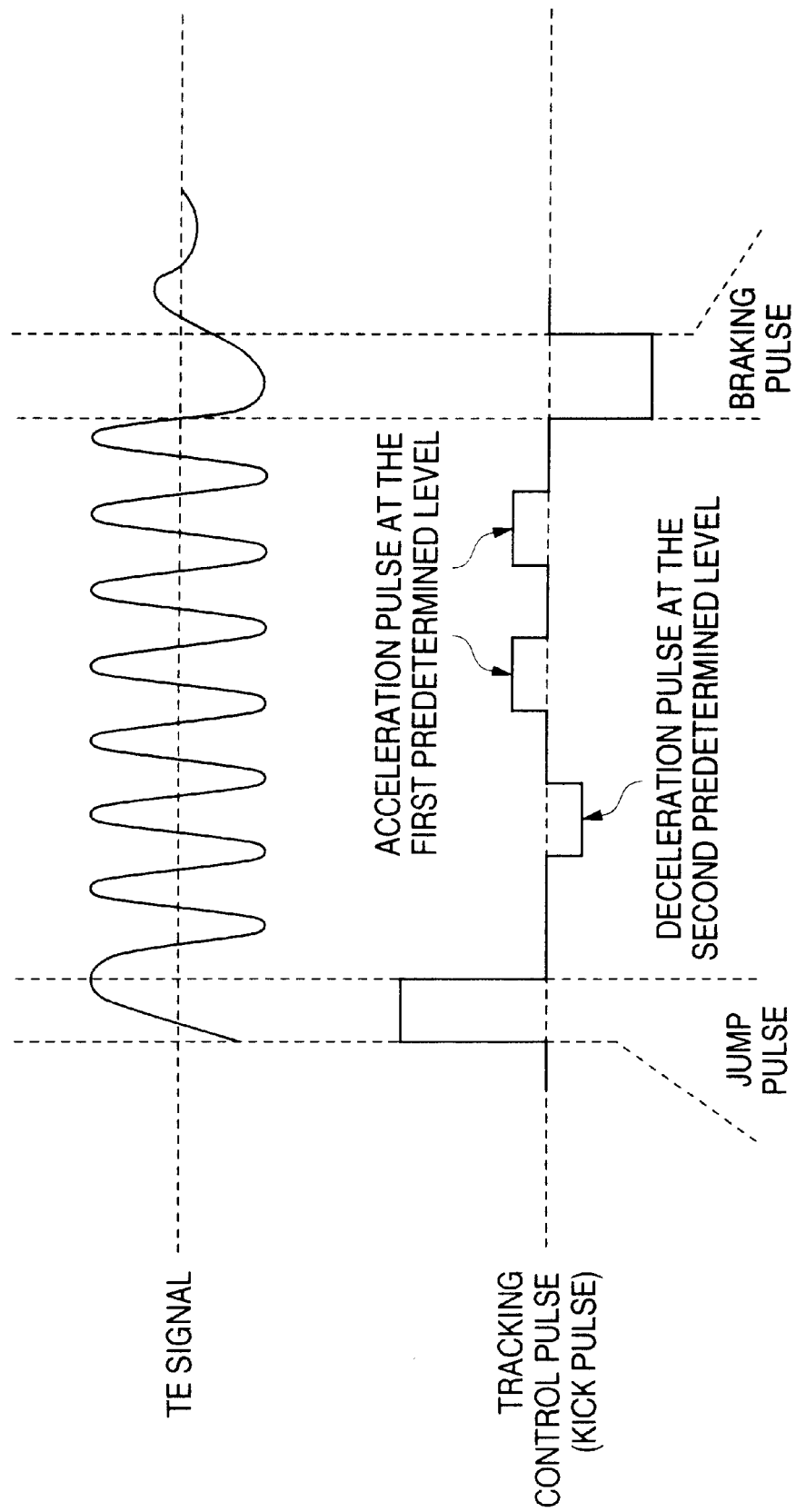

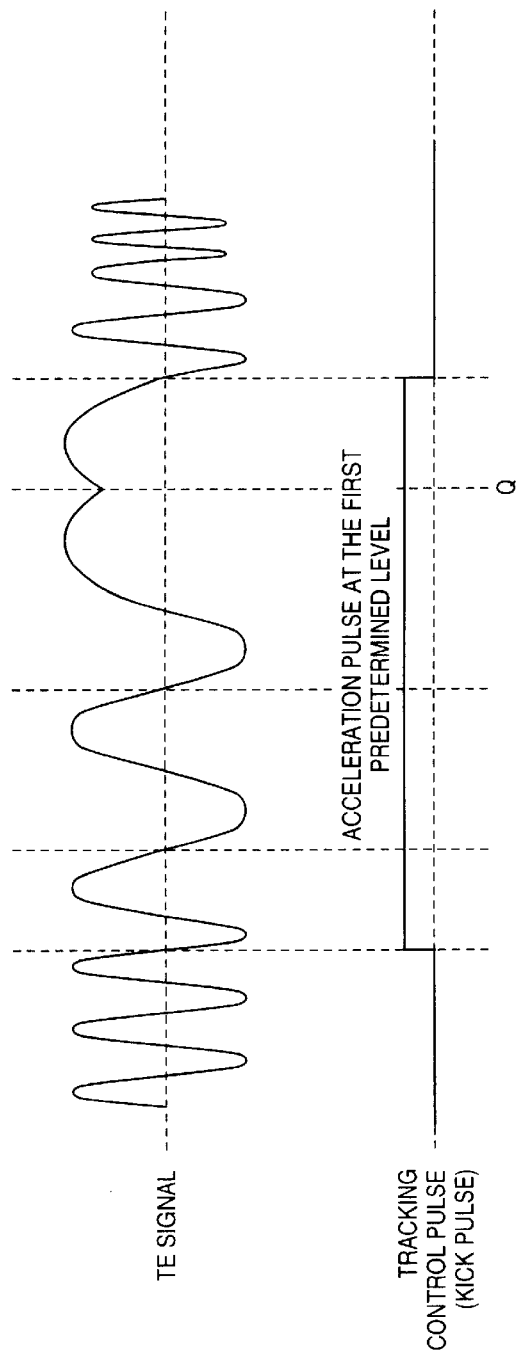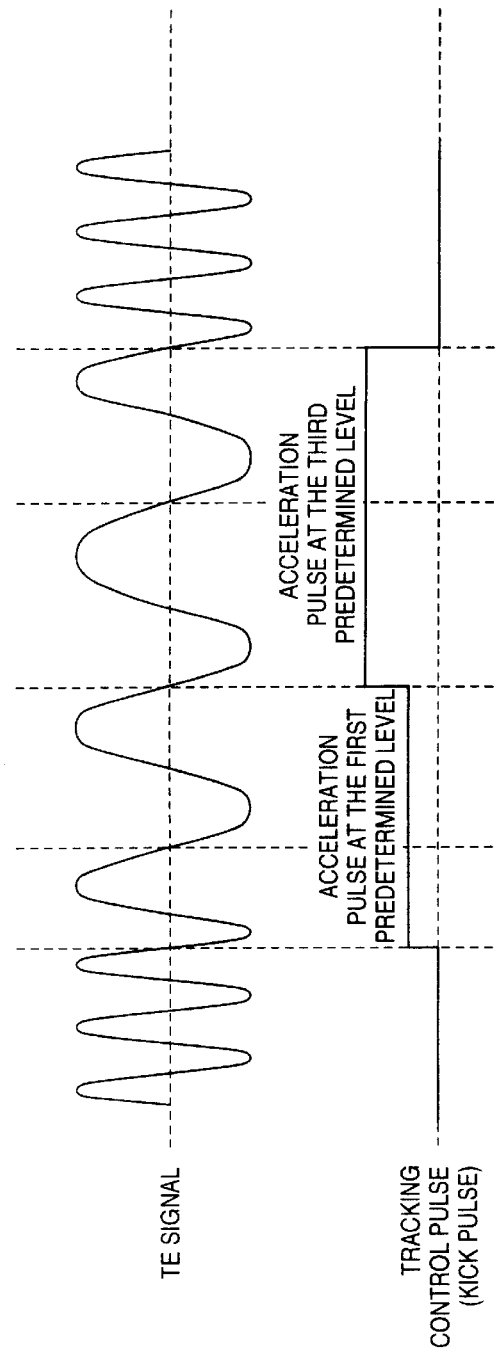

US 6,762,981 B2

TRACK JUMP CONTROLLER AND A TRACK JUMP METHOD

BACKGROUND OF THE INVENTION

The present invention relates to a track jump controller and a track jump method, and in particular to a track jump controller and a track jump method that cause a pickup to jump by the number of target tracks in the track traverse direction by using for example a tracking actuator-driver then apply a braking pulse to stop the pickup.

An example of this type of related art track jump apparatus is disclosed in the Unexamined Japanese Patent Application Publication No. Hei9-102135 [G11B 7/19, G11B 7/085] published on Apr. 15, 1997. In the control circuit of this optical disk apparatus, a braking pulse is output when the lens reaches the position one track before the target track in terminating the seek operation. The control circuit detects the zero crossing cycle of a tracking error signal when the lens reaches a half track before the target track and corrects the magnitude or width of the braking pulse to reach the target track.

Another example of track jump apparatus is disclosed in the Unexamined Japanese Patent Application Publication No. 2000-353324 [G11B 7/085] published on Dec. 19, 2000. In the optical recording/playback apparatus, the travel time to a point in the light beam during jump is measured in the course of focus jumping and the waveform of the deceleration pulse is changed to drive the tracking actuator. After a deceleration signal is output, the travel means is forcibly driven until the level of the tracking error signal drops below the predetermined value. This is provided a stable focus jumping performance with respect to disturbance caused by vibration on the apparatus or partial eccentricity of an optical disk, thereby assuring high-speed playback and recording.

According to such related art technologies, in the former case, a table having the magnitude (level) or width of a braking pulse corresponding to the zero crossing cycle is required. This leads to increased memory capacity. In case eccentricity of the disk is present, as shown in FIG. 10, the disk speed is temporarily greater than the travel speed of the pickup from end of braking to reaching the target track. This reverses the travel direction of the pickup with respect to the disk at the point indicated as P thus causing a tracking fault. That is, the pickup is uncontrollable and as a result, the track is not reached. In such a fault, jump must be retried from the start thus taking time before playback starts.

In the latter case, the travel time is measured during acceleration or a deceleration pulse is calculated from the measured time thus complicating the processing. The pickup is forcibly moved by using the travel means immediately after the output of a deceleration signal to retain the level of the tracking error signal below the predetermined value. The pickup is thus forcibly moved by the travel means even in case the travel direction of the pickup with respect to the disk is the same, which is needless control.

SUMMARY OF THE INVENTION

Thus, the main object of the invention is to provide a track jump controller for disk apparatus and a track jump method effective for a tracking fault caused by an eccentric disk.

The first aspect of the invention is a track jump controller for disk apparatus that causes a pickup to jump by the number of target tracks in the track traverse direction by using a tracking actuator-driver then applies a braking pulse to stop the pickup, characterized in that a kick pulse of the polarity opposite to that of the braking pulse to a tracking actuator-driver when a tracking error signal does not drop below a predetermined value within a predetermined time shorter than the zero crossing cycle of the tracking error signal after the braking pulse is applied.

The second aspect of the invention is a track jump controller including a tracking actuator-driver for driving the pickup in the track traverse direction in track jump, braking pulse application means for applying a braking pulse to the tracking actuator-driver when the number of target tracks have been jumped over, determination means for determining whether a tracking error signal drops below a predetermined value within a predetermined time after the braking pulse is applied, and kick pulse application means for applying a kick pulse of the polarity opposite to that of the braking pulse to the driver when the determination means determines that the tracking error signal drops below the predetermined value.

The third aspect of the invention is a track jump method for disk apparatus that causes a pickup to jump by the number of target tracks in the track traverse direction by using a tracking actuator-driver then applies a braking pulse to stop the pickup, including the steps of (a) jumping over the number of target tracks, (b) applying a braking pulse, (c) determining a tracking error signal drops below a predetermined value within a predetermined time after the braking pulse is applied, and (d) outputting a kick pulse of the polarity opposite to that of the braking pulse when the tracking error signal drops below the predetermined value.

In the track jump controller, when a seek instruction such as fast forwarding, rewinding, selection of music or skipping of music is given during playback of a DVD or a CD, the total number of tracks to be jumped over is calculated based on the current pickup position and the target pickup position and jump is started. That is, the pickup is caused to jump by the number of target tracks (total number of tracks) in the track traverse direction by using a tracking actuator-driver, then a braking pulse is applied to stop the pickup. After the output (application) of the braking pulse is over, it is determined whether the tracking error signal drops below a predetermined value within a predetermined time shorter than the zero crossing cycle of the tracking error signal. In case the tracking error signal does not drop below the predetermined value, it is determined that the travel direction of the pickup or objective lens with respect to the disk is beginning to be reversed, and a kick pulse the polarity opposite to that of the braking pulse, or a correction kick pulse for acceleration in the jump direction, is applied to the tracking actuator-driver. Thus, it is possible to prematurely prevent reversal of the travel direction of the objective lens with respect to the disk.

According to the invention, a correction kick pulse is output based on the level of the tracking error signal at a predetermined time after braking is over in order to prematurely prevent the travel direction of the pickup with respect to the disk from being reversed. This allows the pickup to reach the target track successfully.

The aforementioned object of the invention, other objects, features and advantages will be clear from the detailed description of the following embodiment referring to drawings.

BRIEF DESCRIPTION OF THE DRAWINGS

FIG. 4 is a waveform diagram showing the TE signal and the tracking control pulse assumed when a track jump is made using the disk apparatus shown in the embodiment of FIG. 1;

FIG. 5 is a waveform diagram showing the TE signal and the tracking control pulse during jump when a track jump is made using the disk apparatus shown in the embodiment of FIG. 1;

DETAILED DESCRIPTION OF THE PREFERRED EMBODIMENTS

Figure 1:
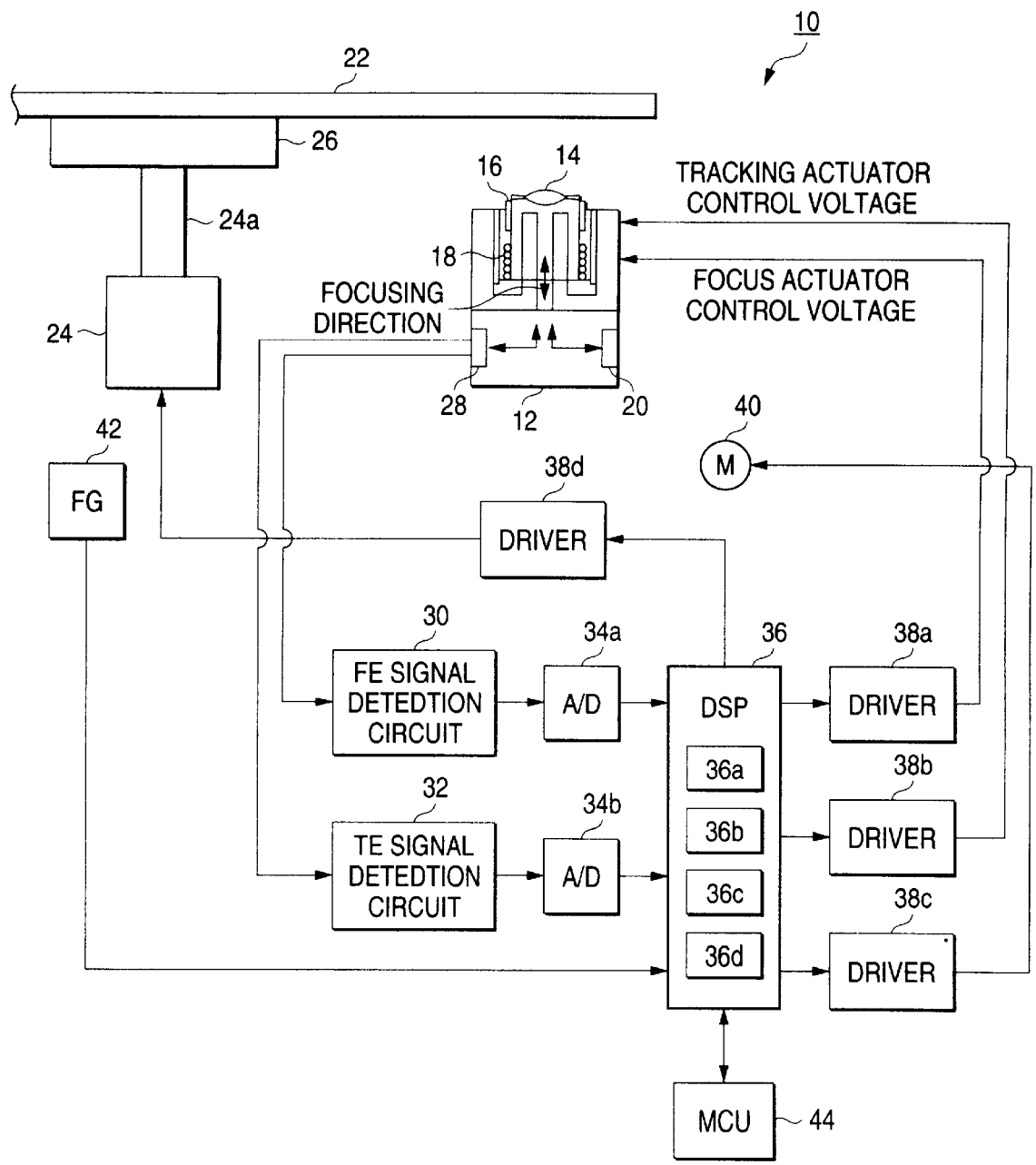
FIG. 1 is an illustration showing the configuration of the embodiment of the invention.

Referring to FIG. 1, disk apparatus 10 in this embodiment is capable of playing back an optical disk (hereinafter referred to as a disk) 22 such as a DVD or a CD and includes a pickup 12. The pickup 12 is provided with an objective lens 14. The objective lens is for example a lens of a double-focus lens system and supported by a tracking actuator 16 and a focus actuator 18. The pickup 12 includes a laser diode (LD) 20. A laser beam emitted from the laser diode is converged by the objective lens 14 and irradiated onto the recording surface of the disk 22.

In particular, in case the disk 22 is a DVD, a transmitted light that passed through the objective lens 14 (zeroth light) is irradiated onto the recording surface of the DVD. In case the disk 22 is a CD, a diffracted light that diffracted through the objective lens 14 (first light) is irradiated onto the recording surface of the CD. Accordingly, a signal recorded on the disk 22 is read (regenerated).

The disk 22 is attached to a turn table 26 fixedly provided on the rotation axis 24a of a spindle motor 24 and caused to rotated in accordance with the rotation of the spindle motor 24. In this embodiment, the disk 22 is a disk of the CLV (constant linear velocity) system and rotation speed of the disk 22 (spindle motor 24) drops as the pickup 12 travels from the internal circumference to the periphery of the disk 22.

A reflected light from the recording surface is passes through the aforementioned objective lens 14 and irradiated onto an photo-detector 28. The output of the photo-detector 28 is input to a focus error (FE) signal detector circuit 30 and a tracking error (TE) signal detector circuit 32.

The FE signal detector circuit 30 detects an FE signal. The TE signal detector circuit 32 detects a TE signal. The FE signal and the TE signal are input to a DSP 36 via an A-D converter 34a and an A-D converter 34b, respectively.

The DSP 36 controls each circuit component under the instruction from a microcomputer unit (MCU) 44 working as a system control microcomputer, executes focus servo processing based on the FE signal and executes tracking servo processing based on the TE signal.

In particular, the focus servo processing generates a pulse (focus control pulse) for controlling the focus actuator 18. The focus control pulse is converted to a focus actuator control voltage in a focus actuator-driver (hereinafter referred to as "driver") 38a and supplied to the focus actuator 18.

The tracking servo processing generates a pulse (tracking control pulse) for controlling the tracking actuator 16. The tracking control pulse is converted to a tracking actuator control voltage in a tracking actuator-driver (hereinafter referred to as "driver") 38b and supplied to the tracking actuator 16.

That is, a travel (position) of the objective lens 14 in the optical axis direction (focus direction) is controlled by the focus actuator control voltage while a travel (position) of the objective lens 14 in the radial direction of the objective lens 14 (radial direction of the disk 22) is controlled by the tracking actuator control voltage.

The thread servo processing generates a pulse (thread control pulse) for driving a thread motor 40. The thread control pulse is converted to a thread control voltage in a thread driver (driver) 38c and supplied to the thread motor 40. The thread control pulse is a PWM signal which controls the rotation speed and the rotating direction of the thread motor 40 and moves in the radial direction of the disk 22 the pickup 12 linked to the rotation axis (not shown) of the thread motor 40 by using the rack and pinion system or the ball screw mechanism.

The rotation servo processing generates a pulse (rotation control pulse) for rotating the spindle motor 24. The rotation control pulse is converted to a rotation control voltage in a spindle driver (driver) 38d and supplied to the spindle motor 24. The rotation control pulse is also a PWM signal, which controls the rotation speed the spindle motor 24.

In the close vicinity of the spindle motor 24 a frequency tachometer generator (FG) 42 is provided which generates a pulse (FG pulse) related to the rotation speed of the spindle motor 24. The FG pulse generated in the FG 42 is input to the DSP 36. When the spindle motor 24 starts (activates) rotation, the DSP 36 detects the rotation speed of the spindle motor 24 based on the FG pulse from the FG 42 and supplies the detected rotation speed to the MCU 44 as well as generates a rotation control pulse so that the spindle motor 24 rotates at a desired rotation speed. Thus, it is possible to successfully rotate the disk 22 of the CLV system.

For example, during playback of the disk 22, when the user enters a seek instruction such as fast forwarding, rewinding, selection of music or skipping of music by using an operation panel (not shown) provided on the main unit of the apparatus or a remote controller (not shown), the seek instruction is supplied to the MCU 44. The MCU 44 responds to the seek instruction and calculates the total number of tracks or total number of tracks 22a (total track number) to be jumped over based on the current pickup position and the target pickup position and supplies a jump instruction and the total number of tracks thus calculated to the DSP 36.

In response to this, a DSP core 36a starts the track jump processing. First, the DSP core 36a stores the total number of tracks in a memory 36b provided in the DSP 36. Next, the DSP core 36a turns off (disables) the tracking servo, generates a tracking control pulse (kick pulse) or jump pulse corresponding to the total number of tracks stored in the memory 36b and supplies (applies) the tracking control pulse to the driver 38b. Accordingly, a tracking actuator control voltage corresponding to the jump pulse is supplied by the driver 38b to the tracking actuator 16. This causes the objective lens 14 to start traveling in the traverse direction of the track 22a, that is, from the internal circumference (periphery) to the periphery (internal circumference) of the disk 22.

Figure 2:
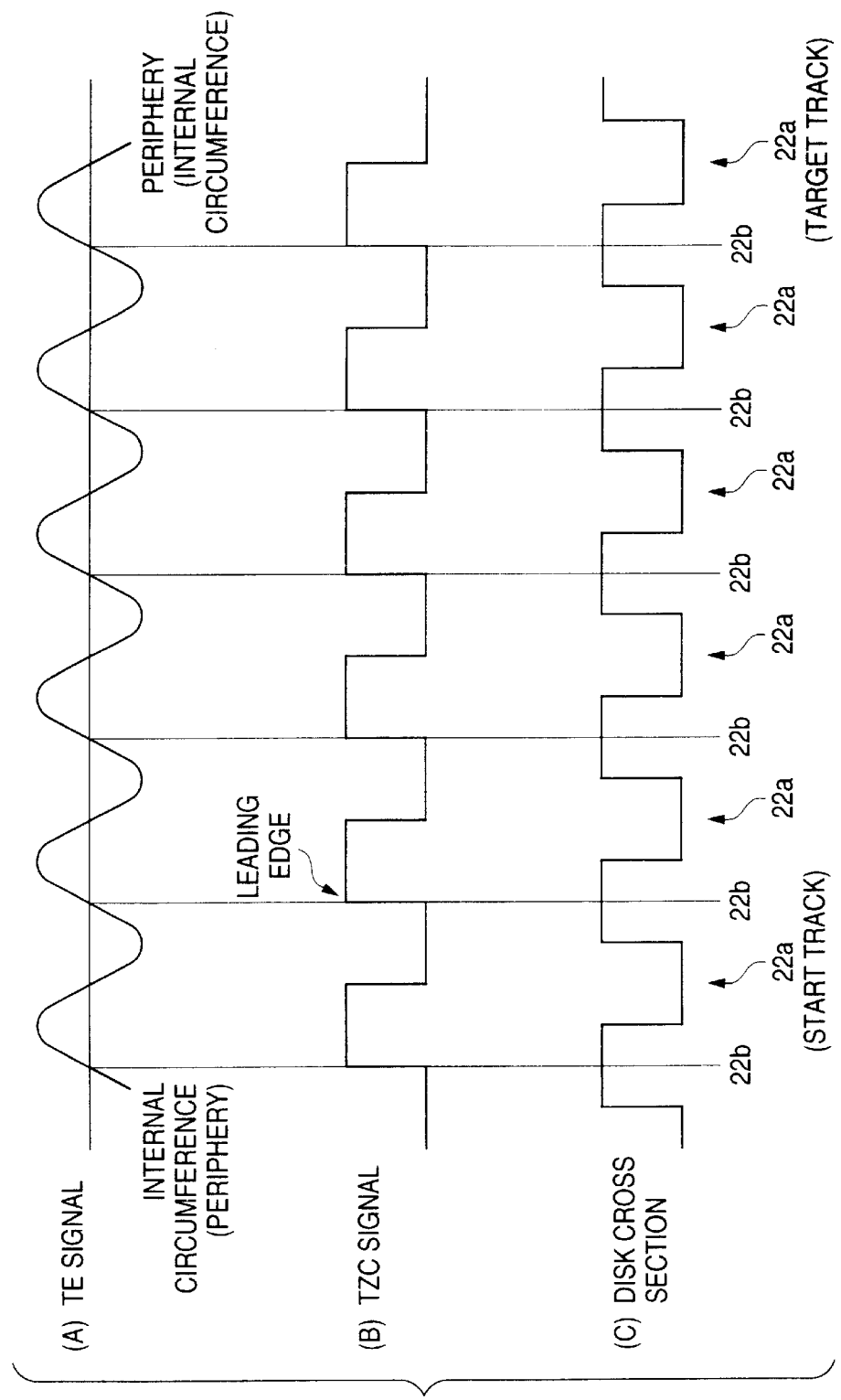
FIG. 2 is an illustration showing the TE signal detected in the TE signal detector circuit shown in the embodiment of FIG. 1, the TZC signal generated based on the TE signal, and the disk cross section for the TE signal and the TZC signal.

During travel or jump of the objective lens 14, a TE signal shown in FIG. 2A is detected in the TE signal detector circuit

30. The TE signal is converted to a binary value using a predetermined threshold by the DSP core 36a and a tracking zero cross (TZC) signal shown in FIG. 2B is generated. A cross section of the disk 22 corresponding to the TE signal and TZC signal is shown in FIG. 2C.

On the disk 22 are formed a track 22a (land) where bits are formed and a mirror section 22b (group) that reflects all laser beams.

The DSP core 36a uses the counter 36c similarly provided in the DSP 36 to count the number of tracks 22a (number of tracks) In particular, the DSP core 36a, detecting the leading edge of the TZC signal shown in FIG. 2B, increments the counter 36c to count the number of tracks. By counting the number of tracks 22a jumped over, the DSP core 36a controls the timing of outputting a kick pulse (braking pulse) for applying a brake.

Figure 3A:
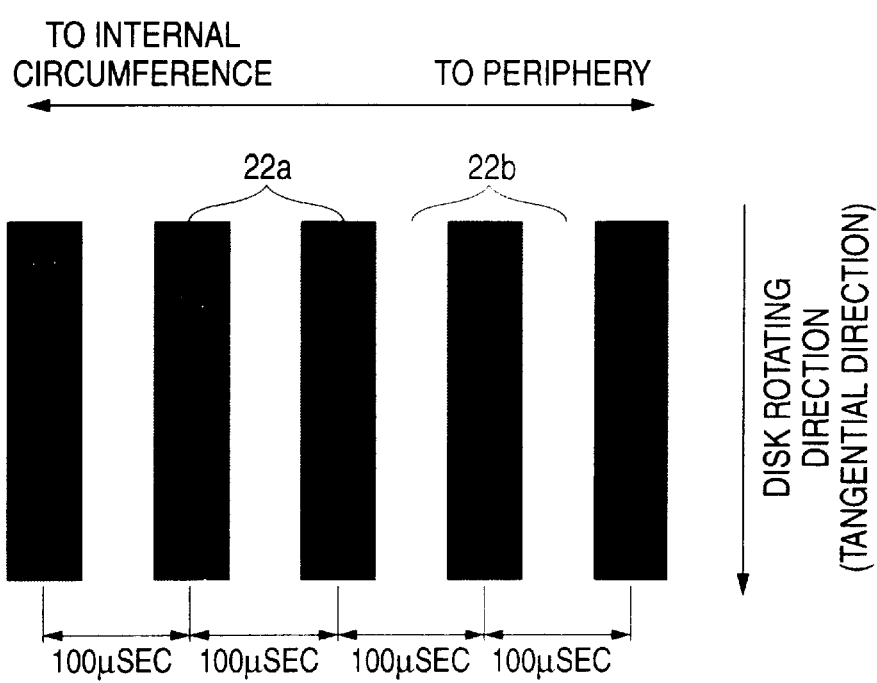
FIG. 3 is an illustration showing an example of the disk shown in the embodiment of FIG. 1.

The aforementioned tracking actuator control voltage or kick pulse is set so that the objective lens 14 can travel across (jump over) the tracks 22a adjacent in specific time intervals (100 microseconds). Thus, as shown in FIG. 3A, in case the adjacent tracks 22a are arranged with a predetermined pitch (0.8 μm for DVD, 1.6 μm for CD), the objective lens 14 travels across the tracks 22a adjacent in approximately specific time intervals.

Figure 3B:
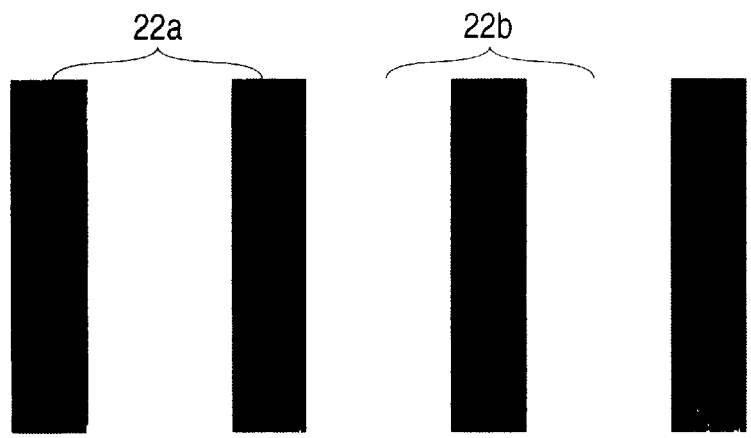
Figure 3C:
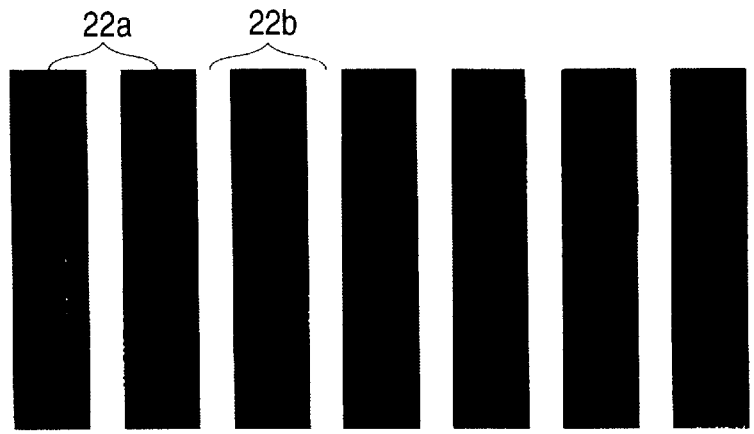

As shown in FIGS. 3B and 3C, in case the pitch (track pitch) between adjacent tracks 22a is coarse or dense, due to eccentricity of the disk 22 or disturbance such as vibration to the apparatus main unit, a kick pulse for adjusting the travels speed of the objective lens 14 is applied to the driver 38b to make control or correction so that the objective lens can travel across the adjacent tracks 22a in specific intervals.

While coarseness and density of the track pitch are exaggerated for clarity in FIGS. 3B and 3C, the travel speed of the objective lens 14 is adjusted for a variation in the track pitch of ±5 percent in this embodiment.

In particular, as shown in FIG. 3B, in case the track pitch is coarse, the travel speed of the objective lens 14 is decreased so that a kick pulse (acceleration pulse) at a first predetermined level is generated in order to accelerate the speed of the objective lens 14 in its travel direction and is applied to the driver 38b. Thus, a tracking actuator control voltage corresponding to the acceleration pulse at the first predetermined level is supplied to the actuator 16.

As shown in FIG. 3C, in case the track pitch is dense, the travel speed of the objective lens 14 is increased so that a kick pulse (deceleration pulse) at a second predetermined level is generated in order to decelerate the speed of the objective lens 14 in its travel direction and is applied to the driver 38b. Thus, a tracking actuator control voltage corresponding to the deceleration pulse at the second predetermined level is supplied to the actuator 16.

In this embodiment, however, the acceleration pulse at the first predetermined level and the deceleration pulse at the second predetermined level are set at a level and width where a variation of up to ±5 percent in the track pitch is corrected and have opposite polarities to each other.

As shown in FIG. 4, from application of a jump pulse for jumping over the total number of tracks to application of a braking pulse, speed control is made by applying as required the acceleration pulse at the first predetermined level or the deceleration pulse at the second predetermined level to the driver 38b to accelerate or decelerate the objective lens 14 in its travel direction so that the objective lens 14 can travel across the adjacent tracks 22a in specific time intervals.

In case the objective lens 14a traverses the section where the track pitch is greater (by +50 percent or more) than the case in FIG. 3B, the speed of the disk 22 is higher than that of the pickup 12 or objective lens 14. In other words, the travel speed of the objective lens 14 is considerably lower with respect to the disk 22. In such a case, applying the aforementioned acceleration pulse at the first predetermined level does not provide sufficient acceleration, resulting in the reversal of the travel direction of the objective lens 14 with respect to the disk 22 at a point designated by Q, as shown in FIG. 5A. Reversal of the relative travel direction disables control of the pickup 12 which could cause runaway of the pickup 12.

Thus, the DSP core 36a, detecting that the objective lens 12 is traveling across the adjacent tracks 22a in time intervals (150 microseconds or more in this case) considerably longer than the specific time intervals, determines that the travel direction of the objective lens 14 with respect to the disk 22 is reversed and generates a kick pulse (acceleration pulse) of a third predetermined level which is greater than the first level and accelerates the objective lens 12 to a large extent in its travel direction, as shown in FIG. 5B, in order to prevent reversal of the relative travel direction.

In this embodiment, the third predetermined level is double the magnitude of the first predetermined level. The third predetermined level may be the same level as the first predetermined level but with the double pulse width.

There may be a case where the pitch of the tracks 22a is smaller than that in FIG. 3C. In this case, the travel direction of the objective lens stays unchanged so that the aforementioned deceleration pulse at the second predetermined level need to be applied for slight deceleration.

In this way, when the objective lens 14 travels toward the track 22a (target track) and reaches a point half tracks before the target track, the DSP core 36a applies a braking pulse to the driver 38b to stop the travel of the 000 14 in the radial direction (in the direction of the internal circumference or periphery of the disk 22).

In this embodiment, the braking pulse is predetermined at a level and width where the travel of the objective lens is stopped in the close proximity of the target track by applying a braking pulse half track before the target track, in case control is made so that the objective lens 12 can travel across the adjacent tracks 22a in specific intervals.

In this embodiment, the braking pulse and the deceleration pulse at the second predetermined level are of the same level and width.

Polarity of the jump pulse, acceleration pulse, deceleration pulse and braking pulse is determined according to the travel direction of the objective lens 14 (direction of the internal circumference or periphery). The jump pulse and the acceleration pulse have a polarity opposite to that of the deceleration pulse and the braking pulse.

In case the vicinity of the target track the objective lens 14 is heading for at the end of a jump sequence shows a considerably greater track pitch (for example +50 percent or more) due to eccentricity of the disk 22 or disturbance, the travel direction of the objective lens with respect to the disk 22 may be reversed. Same as the jump sequence, the speed of the disk 22 may be higher than the travel speed of the pickup 12 or objective lens 14, thus reversing the travel direction of the objective lens 14 with respect to the disk 22 thereby causing runaway of the pickup 12.

Figure 6:
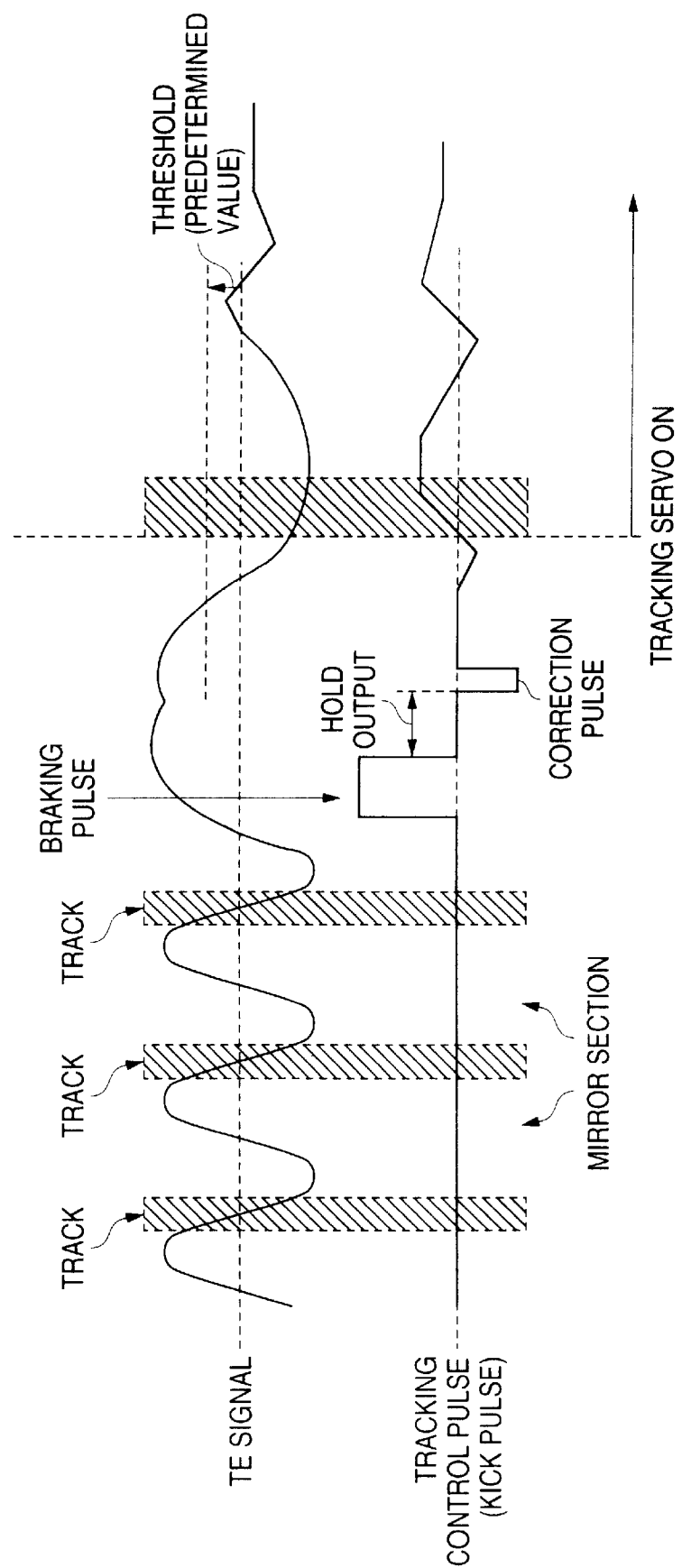
FIG. 6 is a waveform diagram showing the TE signal and the tracking control pulse assumed at the end of a track jump made using the disk apparatus of the embodiment.

In order to avoid such a trouble, in this embodiment, the DSP core 36a, after outputting a braking pulse at the end of a jump, generates a kick pulse at the 0 level (hold) and applies the pulse to the driver 38b as well as detects the level of the TE signal only for a predetermined time (60 microseconds in this embodiment), as shown in FIG. 6. In case the level of the TE signal does not drop below a predetermined threshold (predetermined value), the DSP core 36a determines that the relative travel direction is reversed and generates a kick pulse (correction pulse) for correcting the travel direction and applies the kick pulse to the driver 38b. The correction pulse has a polarity opposite to that of the braking pulse and preset to a specific level and a specific width.

In this way, reversal of the travel direction is prevented so that the pickup 12 (objective lens 14) can reach the target track.

The predetermined time must be set to a time shorter than the zero crossing cycle. In this embodiment, the target value of the zero crossing cycle is set to 100 microseconds so that the predetermined time is set to a shorter time, or 60 microseconds.

Figure 7:
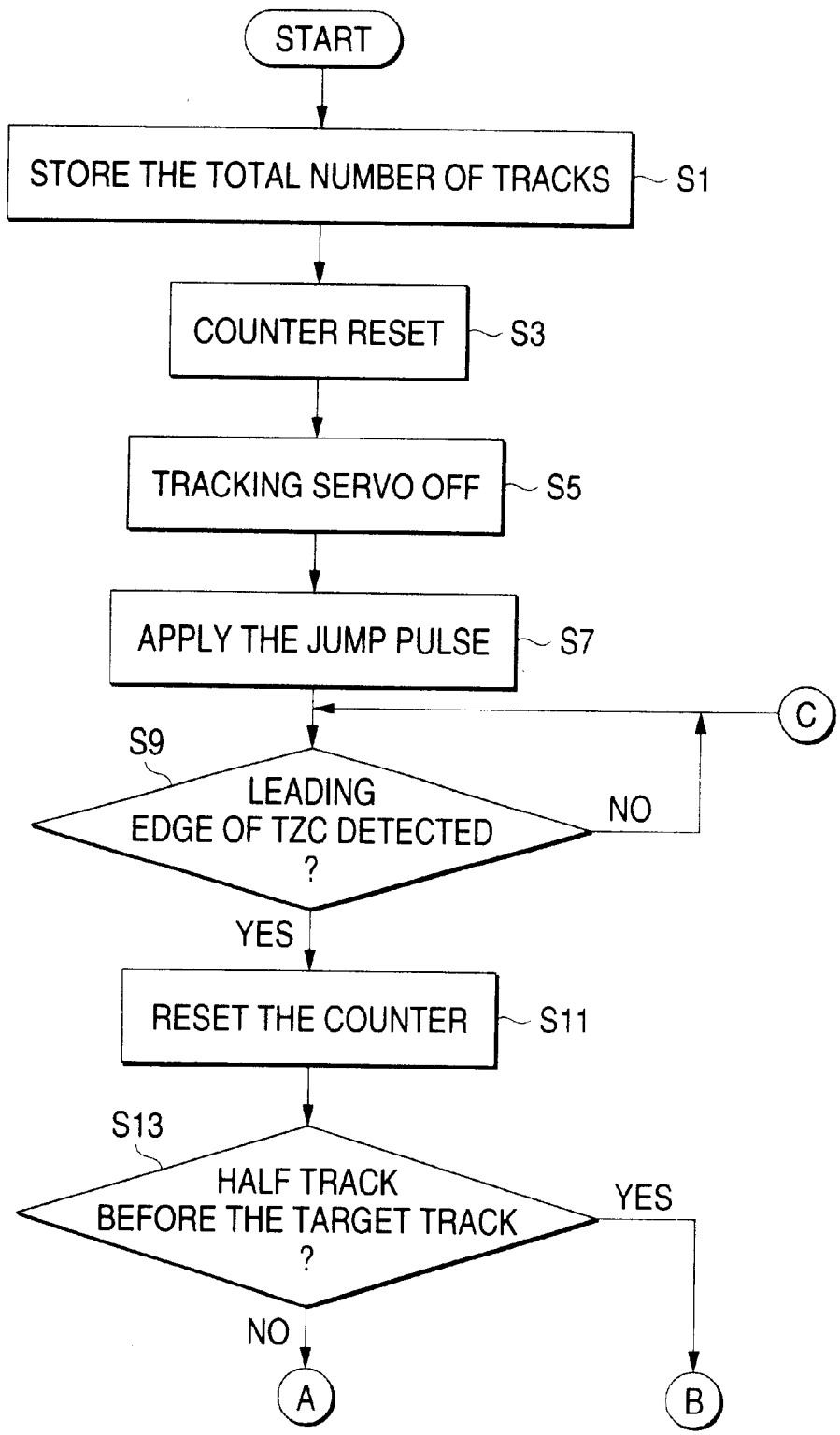
FIG. 7 is a flowchart showing a part of a track jump processing by the DSP core shown in the embodiment of FIG. 1.
Figure 8:
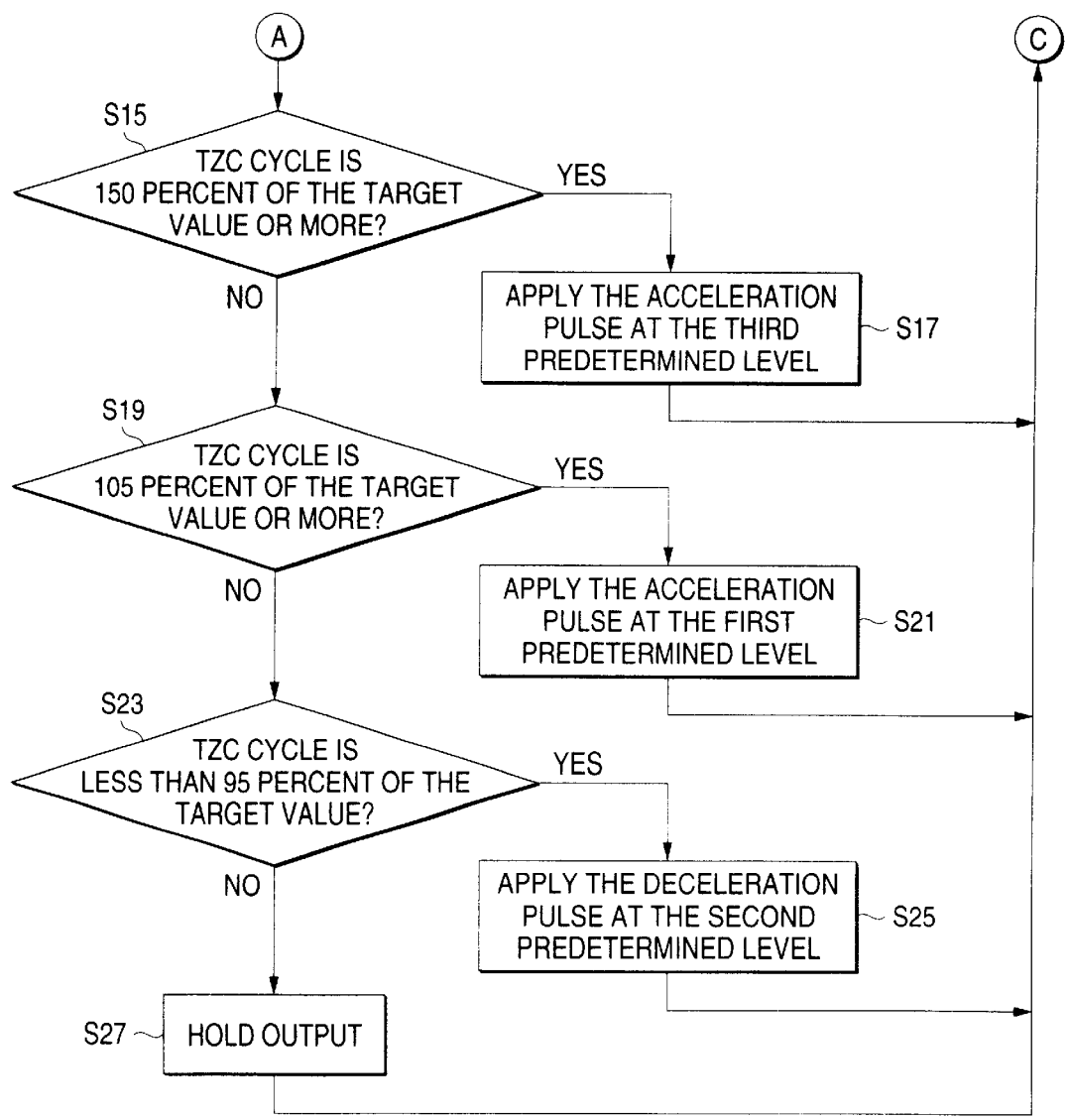
FIG. 8 is a flowchart showing another part of a track jump processing by the DSP core shown in the embodiment of FIG. 1.
Figure 9:
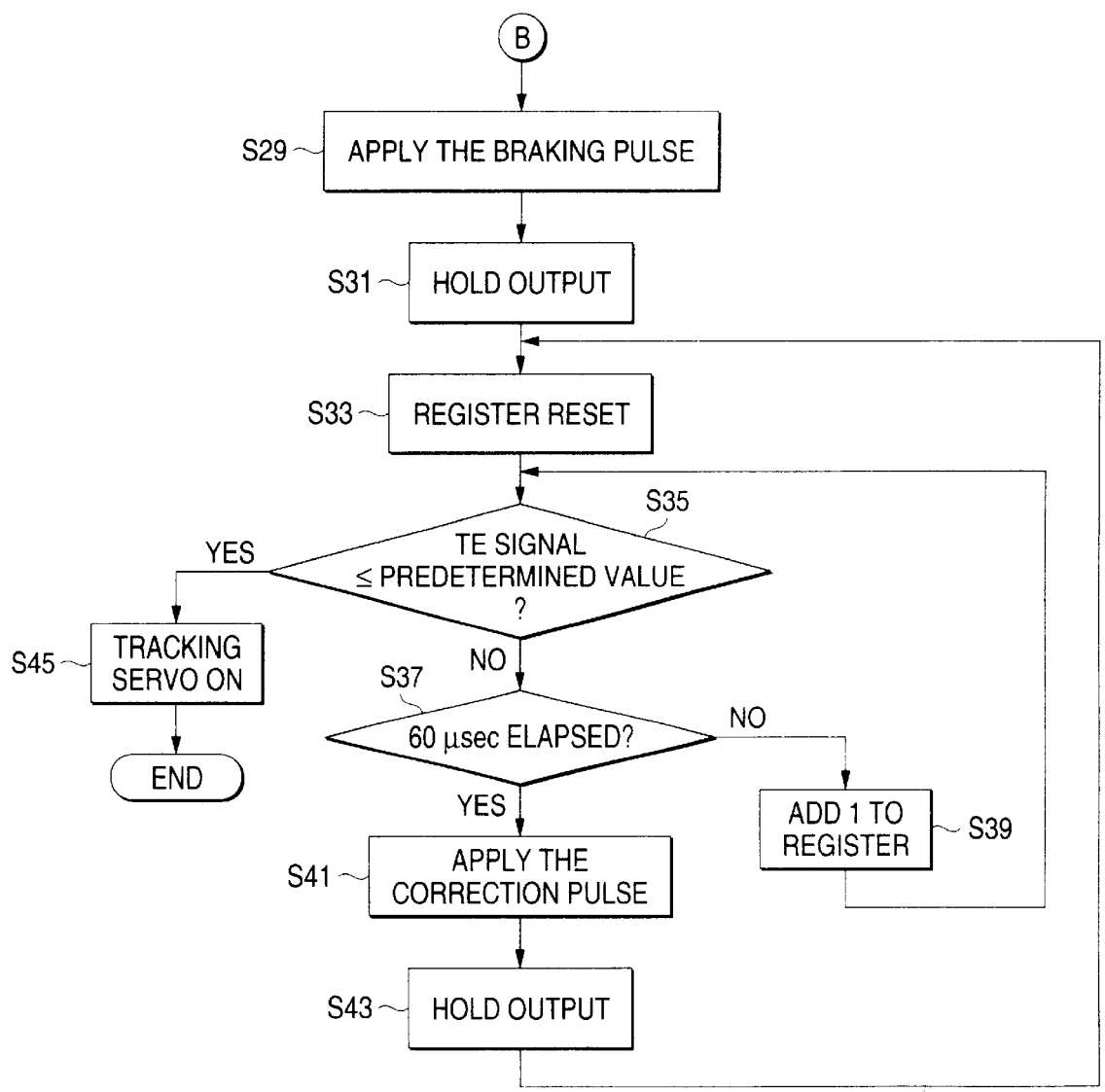
FIG. 9 is a flowchart showing another part of a track jump processing by the DSP core shown in the embodiment of FIG. 1.
Figure 10:
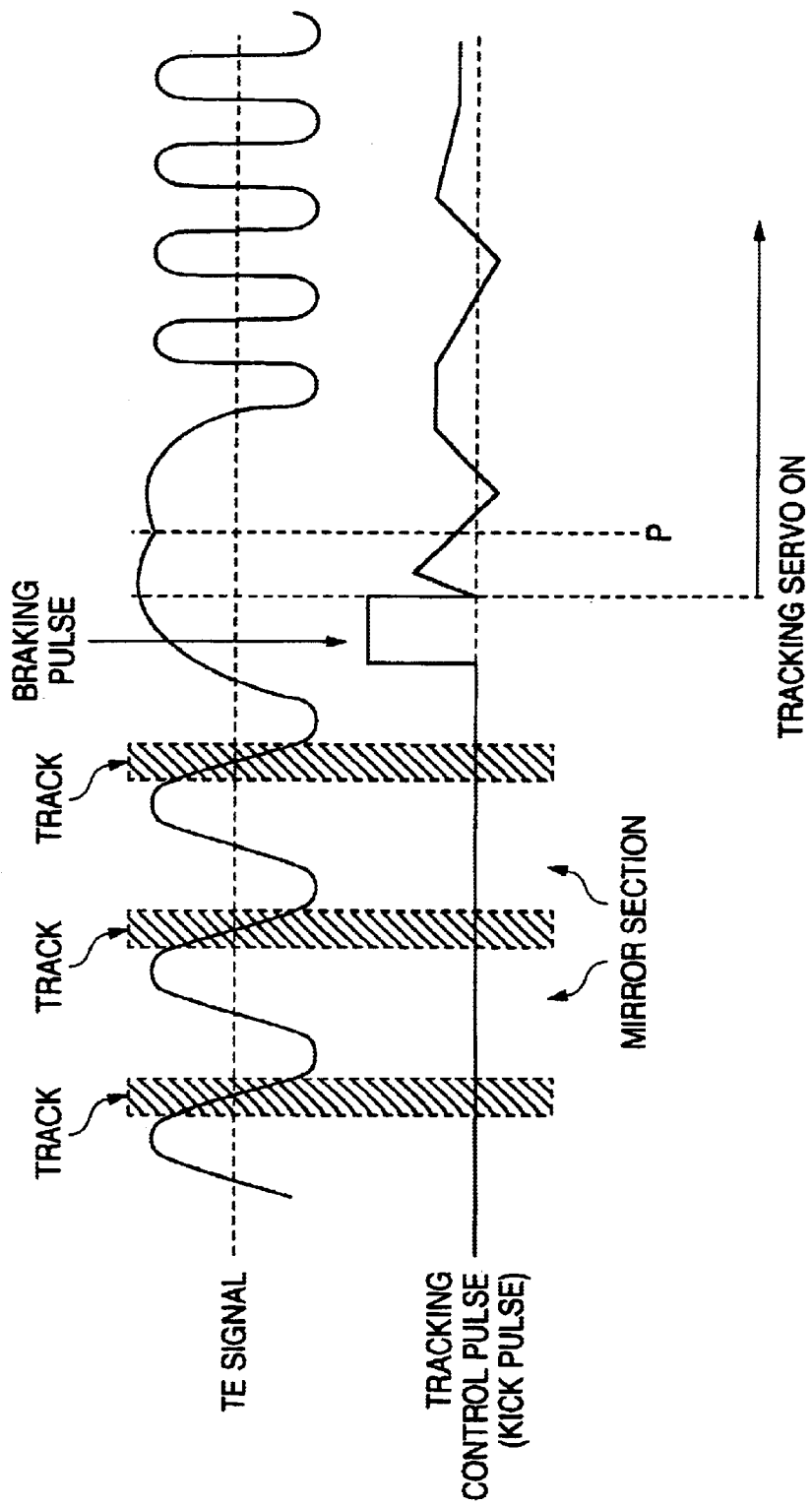
FIG. 10 is a waveform diagram showing the TE signal and the tracking control pulse assumed at the end of a track jump made using the related art disk apparatus.

The DSP core 36a performs the aforementioned operation in accordance with the flowchart in FIGS. 7 through 9. As mentioned earlier, the DSP core 36a, receiving a jump instruction and the total number of tracks from the MCU 44, starts the track jump processing and stores the total number of tracks in the memory 36b instep S1 in FIG. 7.

In the subsequent step S3, the DSP core 36a resets the counter 36c provided similarly provided in the DSP 36. In step S5, the DSP core 36a turns off (disables) the tracking servo. In particular, the DSP core 36a only detects the output signal from the TE signal detector circuit 32, without generating a tracking actuator control voltage based on the detected TE signal. That is, the DSP core 36a operates so that the objective lens 14 will not retrieve the track 22a based on the TE signal.

In step S7, the DSP core 36a generates a jump pulse for jumping over the total number of tracks stored in the memory 36b and applies the jump pulse thus generated to the driver 38b. Thus, a tracking actuator control voltage corresponding to the jump pulse is supplied to the tracking actuator 16 and the objective lens 14 starts traveling toward the desired (target) track.

While the objective lens 14 is traveling, the DSP 36 generates the aforementioned TZC signal based on the output from the A-D converter 34b. Detecting the leading edge of the TZC signal in step S9, the DSP 36 increments the counter 36c in step S11, in case the DSP 36 does not detect the leading edge of the TZC signal in step S9, execution returns to step 9. In this way, the number of tracks 22a jumped over is counted by using the counter 36c.

In the subsequent step S13, the DSP 36 determines whether the pickup is half track before the target track. As shown in FIG. 2C, in case the pickup 12 (objective lens 14) jumps from the track 22a (start track) it traced to the target track, the total number of tracks to be jumped over coincides with the number of the leading edges of the TZC signal to be counted. When the total number of tracks coincides with the count value, the objective lens 14 is at the mirror section 22b or half track before the target track. Thus, the DSP core 36 compares the total number of tracks stored in the memory 36b with the count value of the counter 36c and determines whether the count value of the counter 36c coincides with the total number of tracks.

In the case of "NO" in step S13, that is, in case the count value of the counter 36c does not coincide with the total number of tracks, the DSP core 36a determines that the objective lens 14 does not reached the point half track before the target track and determines whether the cycle of the TZC signal (zero crossing cycle) is at least 150 percent of the target cycle in step S15. While the DSP core 36a causes the objective lens 14 to travel so that the leading edge of the TZC signal is detected every 100 microseconds, the DSP core 36a determines whether the cycle of the TZC signal is at least 150 percent of the target value (100 microseconds) of the zero crossing cycle.

The zero crossing cycle is monitored by the DSP core 36a resetting and starting the timer (not shown) at the leading edge of the TZC signal.

In the case of "YES" in step S15, that is, in case the zero crossing cycle is 150 percent of the target value or more, the DSP core 36a determines that the travel of the objective lens 12 is delayed with respect to the disk 22 (track 22a), or the relative travel direction is getting reversed, and generates an acceleration pulse at the third predetermined level in step S17 and applies the acceleration pulse to the driver 38b. Then execution returns to step S9 shown in FIG. 7.

A tracking actuator control voltage corresponding to the acceleration pulse at the third predetermined level is supplied by the driver 38b to the tracking actuator 16 thus accelerating the objective lens 14 to a great extent in its travel direction. It is thus possible to prevent the relative travel direction from being reversed.

In the case of "NO" in step S15, that is, in case the zero crossing cycle is less than 150 percent of the target value, the DSP core 36a determines whether the zero crossing cycle is 105 percent of the target value (105 microseconds) or more in step S19. In the case of "YES" in step S19, that is, in case the zero crossing cycle is 150 percent of the target value or more, the DSP core 36a generates an acceleration pulse at the first predetermined level which is smaller than the third predetermined level in step S21 and applies the acceleration pulse to the driver 38b. Then execution returns to step S9.

A tracking actuator control voltage corresponding to the acceleration pulse at the first predetermined level is supplied by the driver 38b to the tracking actuator 16 thus accelerating the objective lens 14 slightly in its travel direction.

In the case of "NO" in step S19, that is, in case the zero crossing cycle is less than 105 percent of the target value, the DSP core 36a determines whether the zero crossing cycle is less than 95 percent of the target value (95 microseconds) in step S23. In the case of "YES" in step S23, that is, in case the zero crossing cycle is 95 percent of the target value or more, the DSP core 36a generates a deceleration pulse at the second predetermined level in step S25 and applies the deceleration pulse to the driver 38b. Then execution returns to step S9.

A tracking actuator control voltage corresponding to the deceleration pulse at the second predetermined level is supplied by the driver 38b to the tracking actuator 16 thus decelerating the objective lens 14 slightly in its travel direction.

In the case of "NO" in step S23, that is, in case the zero crossing cycle is less than 95 percent of the target value, the DSP core 36a generates a kick pulse (hold) at the 0 level in step S27 and applies the kick pulse to the driver 38b, that is, outputs a tracking actuator control voltage of 0 volts. Then execution returns to step S9.

In the case of "YES" in step S13 shown in FIG. 7, that is, in case the count value of the counter 36c coincides with the total number of tracks, the DSP core 36a determines that the objective lens reaches the point half track before the target track, generates a braking pulse in step S29 shown in FIG. 9, and applies the braking pulse to the driver 38b. Accordingly, a tracking actuator control voltage corresponding to the braking pulse is supplied by the driver 38b to the tracking actuator 16 thus stopping the objective lens 14. In the subsequent step S31, the DSP core 36a applies the hold to the driver 38b. That is, a tracking actuator control voltage of 0 volts is output.

The DSP core 36a resets a register 36d provided in the DSP 36 in step S33 and determines whether the level of the TE signal is equal to or below the predetermined value. In the case of "YES" in step S35, that is, in case the level of the TE signal is equal to or below the predetermined value, the DSP core 36a turns on (enables) the tracking servo in step S45 to terminate processing.

When the tracking servo is turned on, the objective lens 14 retrieves the track based on the TE signal and the objective lens 14 reaches the target track.

In the case of "NO" in step S35, that is, in case the level of the TE signal is greater than the predetermined value, the DSP core 36a references the value of the register 36d to determine whether the predetermined time (60 microseconds) elapses in step S37. In the case of "NO" in step S37, that is, in case 60 microseconds does not elapse, the DSP core 36a adds 1 to the register 36d in step S39. Then execution returns to step S35.

In this embodiment, whether the level of the TE signal is equal to or below the predetermined value is detected with interrupts that occurs every microsecond and the elapsed time is counted using the register 36d to determine whether 60 microseconds elapses.

In the case of "YES" in step S37, that is, in case 60 microseconds elapses while the level of the TE signal is greater than the predetermined value, the DSP core 36a determines that the travel direction of the objective lens 14 with respect to the disk 22 is reversed and generates a correction pulse in step S41, then applies the correction pulse to the driver 38b. Accordingly, a tracking actuator control voltage corresponding to the correction pulse is supplied by the driver 38b to the tracking actuator 16 thus accelerating the objective lens 14 slightly in its travel direction of jump. The DSP core 36a outputs the hold in step S43. Then execution returns to step S35.

In case the level of the TE signal does not become equal to or below the predetermined value, a correction pulse is output again.

According to the embodiment, the TE signal is detected only for a predetermined time at the end of a seek (jump) and in case the level of the TE signal does not become equal to or below the predetermined value, a correction pulse is applied to accelerate the travel speed of the objective lens. This prevents the travel direction of the objective lens from being reversed with respect to the disk. It is thus possible to prematurely prevent a tracking fault caused by eccentricity of a disk thus allowing the objective lens to reach the target track successfully. This assures quick start of playback.

While a kick pulse or jump pulse, an acceleration pulse, a deceleration pulse a braking pulse, hold, and a correction pulse are applied to the driver 38b and a tracking control voltage is supplied to the tracking actuator 16 in this embodiment, the tracking actuator control voltage may be corrected using an offset voltage and the resulting voltage may be supplied to the tracking actuator 16, since the tracking actuator may suffer from an offset caused by surface vibration of the disk 22. The offset voltage is a focus actuator control voltage assumed just before starting a track jump and is easily obtained.

While, in case the level of the TE signal does not become equal to or below the predetermined value after a correction pulse is output, the correction pulse is output again in this embodiment, the level of the TE signal may be detected during output of the correction pulse and in case the level of the TE signal does not become equal to or below the predetermined value, the level of the correction pulse maybe upgraded and/or the width of the correction pulse may be expanded.

What is claimed is:

1. A track jump controller for disk apparatus comprising:

a tracking actuator-driver; and a pickup which is jumped by the number of target tracks in the track traverse direction by said tracking actuator-driver and is stopped by applying a braking pulse, wherein
        a kick pulse of a polarity opposite to a polarity of the braking pulse to a tracking actuator-driver when a tracking error signal is not dropped below a predetermined value within a predetermined time shorter than a zero crossing cycle of the tracking error signal after the braking pulse is applied.

2. A track jump controller comprising:

a tracking actuator-driver for driving a pickup in the track traverse direction in track jump, braking pulse application means for applying a braking pulse to said tracking actuator-driver when the number of target tracks is jumped over, determination means for determining whether a tracking error signal is dropped below a predetermined value within a predetermined time after the braking pulse is applied, and kick pulse application means for applying a kick pulse of a polarity opposite to a polarity of the braking pulse to said tracking actuator-driver when said determination means determines that the tracking error signal is dropped below the predetermined value.

3. The track jump controller according to claim 2, wherein the predetermined time is shorter than the zero crossing cycle of the tracking error signal.

4. The track jump controller according to claim 2, wherein the kick pulse has a specific level and a specific width.

5. A track jump method for disk apparatus that causes a pickup to jump by the number of target tracks in the track traverse direction by a tracking actuator-driver then applies a braking pulse to stop said pickup, said method comprising the steps of:
        (a) jumping over the number of target tracks,
        (b) applying a braking pulse,
        (c) determining a tracking error signal is dropped below a predetermined value within a predetermined time after the braking pulse is applied, and
        (d) outputting a kick pulse of a polarity opposite to a polarity of the braking pulse when the tracking error signal is dropped below the predetermined value.

6. The track jump method according to claim 5, wherein the predetermined time is shorter than a zero crossing cycle of said tracking error signal.

* * * * *